(12) United States Patent
Fan et al.

(10) Patent No.: US 10,054,822 B2
(45) Date of Patent: Aug. 21, 2018

(54) FRAME SEALANT COMPOSITION, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Jian Li, Beijing (CN); Hongpeng Li, Beijing (CN); Weixin Meng, Beijing (CN); Shichao Wang, Beijing (CN); Jingpeng Li, Beijing (CN); Sung Hun Song, Beijing (CN); Minqiang Yang, Beijing (CN); Hong Zhang, Beijing (CN); Yan Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 158 days.

(21) Appl. No.: 15/038,573

(22) PCT Filed: Aug. 21, 2015

(86) PCT No.: PCT/CN2015/087762
§ 371 (c)(1),
(2) Date: May 23, 2016

(87) PCT Pub. No.: WO2016/169172
PCT Pub. Date: Oct. 27, 2016

(65) Prior Publication Data
US 2017/0038619 A1 Feb. 9, 2017

(30) Foreign Application Priority Data
Apr. 22, 2015 (CN) .......................... 2015 1 0194928

(51) Int. Cl.
*G02F 1/1339* (2006.01)
*C09J 123/02* (2006.01)
*C09J 183/04* (2006.01)

(52) U.S. Cl.
CPC .......... *G02F 1/1339* (2013.01); *C09J 123/02* (2013.01); *C09J 183/04* (2013.01); *Y10T 428/1059* (2015.01); *Y10T 428/1068* (2015.01)

(58) Field of Classification Search
CPC ..... C09J 123/02; C09J 183/04; G02F 1/1335; G02F 1/1339; Y10T 428/1059; Y10T 428/1082; Y10T 428/1068
See application file for complete search history.

(56) References Cited

U.S. PATENT DOCUMENTS

| | | | | |
|---|---|---|---|---|
| 4,626,073 A | * | 12/1986 | Amstutz | G02F 1/1339 349/149 |
| 6,249,085 B1 | * | 6/2001 | Arai | C09K 11/06 313/503 |
| 2007/0075329 A1 | * | 4/2007 | Kim | H01L 27/3276 257/103 |

FOREIGN PATENT DOCUMENTS

| | | |
|---|---|---|
| CN | 1475849 A | 2/2004 |
| CN | 101551558 A | 10/2009 |

(Continued)

OTHER PUBLICATIONS

Second Chinese Office Action dated Sep. 12, 2017.
(Continued)

*Primary Examiner* — Sophie Hon
(74) *Attorney, Agent, or Firm* — Dilworth & Barrese, LLP.; Michael J. Musella, Esq.

(57) ABSTRACT

A frame sealant composition, a display panel and a display device are provided, and the frame sealant composition includes a frame sealant (1) and an elastomer (2), wherein upon the frame sealant composition being used for cell-
(Continued)

assembling of two substrates (100, 200), the elastomer (2) is pressed by the two substrates (100, 200) to form a barrier structure. With the frame sealant composition provided by the embodiment of the present disclosure, an impact of the liquid crystal layer (400) to the frame sealant in the process of cell-assembling the two substrates is effectively reduced, and a puncture resistance of the frame sealant is improved, thereby a product yield is increased.

9 Claims, 2 Drawing Sheets

(56) References Cited

FOREIGN PATENT DOCUMENTS

| | | | |
|---|---|---|---|
| CN | 202182997 U | | 4/2012 |
| CN | 202267803 U | | 6/2012 |
| CN | 102854666 A | | 1/2013 |
| CN | 103205216 A | | 7/2013 |
| CN | 103305133 A | | 9/2013 |
| CN | 103788880 A | | 5/2014 |
| CN | 104327772 A | | 2/2015 |
| CN | 104749828 A | | 7/2015 |
| JP | 2001005005 A | * | 1/2001 |
| JP | 2007248955 A | * | 9/2007 |

OTHER PUBLICATIONS

Search Report and Written Opinion dated Feb. 2, 2016 from State Intellectual Property Office of the P.R. China.
Chinese Office Action dated Mar. 8, 2017.

* cited by examiner

FRAME SEALANT COMPOSITION, DISPLAY PANEL AND DISPLAY DEVICE

TECHNICAL FIELD

Embodiments of the present disclosure relate to a frame sealant composition, a display panel and a display device.

BACKGROUND

Liquid crystal display devices have become the mainstream products in flat-panel displaying market with its high quality, high space utilization rate, low power consumption, no radiation and other advantages. The traditional manufacturing process of the liquid crystal display device is that an array substrate and a color film substrate are bonded together through cell-assemble process to form a liquid crystal display device. The array substrate and the color film substrate are bonded together through frame sealant, and it is necessary to add silicon balls, glass fiber and other spacers to the frame sealant for supporting the liquid crystal panel.

However, in the process of cell-assembling an array substrate and a color film substrate, the liquid crystal is easy to impact the frame sealant, thereby causing puncture and other undesirable phenomena. Especially with the improvement of the narrow frame technology, the width of the frame sealant is also smaller and smaller, which further reduces the puncture resistance of the frame sealant, so that the yield of the product is reduced or is not capable of meeting the mass production.

SUMMARY

Embodiments of the present disclosure provide a frame sealant composition, and the frame sealant composition includes a frame sealant and an elastomer, wherein upon the frame sealant composition being used for cell-assembling of two substrates, the elastomer is pressed by the two substrates to form a barrier structure.

In an embodiment of the present disclosure, a elastomer upon being not pressed is of a ball shape, and the diameter of the elastomer upon being not pressed is from 3.6 μm to −11 μm.

In an embodiment of the present disclosure, a material of the elastomer comprise at least one of an olefin hydrocarbon and an organic silicon.

In an embodiment of the present disclosure, a mass percentage of the elastomer in the frame sealant composition is from 0.01% to −80%, or from 10% to −70%, or from 30%-% to 50%.

In an embodiment of the present disclosure, the elastomers are evenly distributed in the frame sealant.

Embodiments of the present disclosure further provide a display panel, and the display panel comprises a first substrate, a second substrate, a liquid crystal layer and a sealing layer for sealing the liquid crystal layer between the first substrate and the second substrate, the sealing layer comprises a first sealing pattern made of the above frame sealant composition.

In an embodiment of the present disclosure, the elastomer upon being not pressed is of a ball shape, and the diameter of the elastomer upon being not pressed is larger than a distance between the first substrate and the second substrate.

In an embodiment of the present disclosure, the first sealing pattern comprises a plurality of mutually nested annular sealing areas surrounding the liquid crystal layer.

In an embodiment of the present disclosure, in any two adjacent annular sealing areas, a number of the elastomers in a unit volume of an annular sealing area close to the liquid crystal layer is greater than a number of the elastomers in a unit volume of an annular sealing area away from the liquid crystal layer.

In an embodiment of the present disclosure, the sealing layer further comprises a second sealing pattern comprising the frame sealant, and the second sealing pattern is disposed at a side of the first sealing pattern away from the liquid crystal layer.

Embodiments of the present disclosure further provide a display device, and the display device comprises the above display panel.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the disclosure and thus are not limitative of the disclosure.

DESCRIPTION OF THE REFERENCE NUMERALS

Figure 1:
FIG. 1 shows a schematic view of a display panel provided by an embodiment of the present disclosure.

100—first substrate; 200—second substrate; 300—sealing layer; 400—liquid crystal layer; 310—first sealing pattern; 2—elastomer; 1—frame sealant; 311, 312—annular sealing area.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a frame sealant composition, and the frame sealant composition includes a frame sealant and an elastomer, wherein upon the frame sealant composition being used for cell-assembling of two substrates, the elastomer is pressed by the two substrates to form a barrier structure.

In the frame sealant composition provided by the embodiments of the present disclosure, elastomers are added, when the frame sealant composition is used in a cell-assembling of two substrates, the elastomers are pressed by the two substrates to form a barrier structure. The barrier structure which is formed by the elastomers is capable of effectively reducing the impact of the liquid crystal layer to the frame sealant in the process of cell-assembling the two substrates and improving the puncture resistance, thereby a product yield is increased.

In the frame sealant composition in the embodiments of the present disclosure, wherein the elastomers may be of any shapes, a size of the elastomers can be set according to a cell clearance of the display panel. That is in the case that the frame sealant composition is used in the cell-assembling of two substrates, the elastomers of the above shape and size can be pressed and deformed by the two base plates, thus, the barrier structure is formed between the two substrates.

For example, the thickness of the liquid crystal cell is from 3.2 μm to 3.5 μm, for example, a spherical elastomer can be used, and its diameter is 3.6 μm to 11 μm, for example, is 5 μm, 8 μm or 10 μm and so on, only the diameter of the spherical elastomer is larger than the cell clearance of the display panel.

In the embodiments of the present disclosure, a material of the elastomer added to the frame sealant is at least one of an olefin hydrocarbon and an organic silicon. The spherical elastomer can be obtained in a suitable method, for example, an emulsion method or a suspension method. For example, the main component of the elastomer may be an olefin with an elastic component, or a silicone rubber with a silicon base as the main body. The elastomer of the above materials has a structure of polymer chain, therefore, it has better puncture resistance and the puncture resistance is far better than un-curved UV glue or mixing glue dominated by UV glue and other small size organic or inorganic sphere fillers.

For example, the elastomer of the olefin hydrocarbon or the organic silicon can be added to a traditional frame sealant in the process of stirring or before stirring, and stirring to make the elastomers evenly distribute in the frame sealant, thereby obtaining the frame sealant composition. The mass percentage of the elastomer in the frame sealant composition is from 0.01% to 80%, for example, it can be 10%, 30%, 50% or 70% and so on, so that it not only plays the role of sealing but also plays the role of resisting impaction.

A display panel is also provided by the embodiments of the present disclosure, and the display panel includes a first substrate, a second substrate, a liquid crystal layer and a sealing layer for sealing the liquid crystal layer between the first substrate and the second substrate, the sealing layer includes a first sealing pattern made of the above-mentioned frame sealant composition.

Referring to FIG. 1, FIG. 1 shows a schematic view of a display panel provided by an embodiment of the present disclosure. The display panel includes a first substrate 100, a second substrate 200, a liquid crystal layer 400 and a sealing layer 300 for sealing the liquid crystal layer 400 between the first substrate 100 and the second substrate 200, the sealing layer 300 includes a first sealing pattern 310, and the first sealing pattern 310 is formed by the frame sealant composition comprising the elastomers 2 and the frame sealant 1. The elastomers 2 are clamped between the first substrate 100 and the second substrate 200 and is pressed and deformed by the two base plates. In a cell-assembling process of the first substrate 100 and the second substrate 200, the elastomers 2 are pressed by the two substrates to form a barrier structure. The barrier structure formed by the elastomers 2 is capable of effectively reducing an impact of the liquid crystal layer 400 to the frame sealant in the process of cell-assembling the two substrates and improving the puncture resistance, thereby the product yield is increased.

For example, the elastomer 2 is of a ball shape when not being pressed, and a diameter of the elastomer 2 is larger than a distance between the first substrate 100 and the second substrate 200.

The first sealing pattern is constituted of a plurality of mutually nested annular sealing areas surrounding the liquid crystal layer. For example, in any two adjacent annular sealing areas, a number of the elastomers in a unit volume of an annular sealing area close to the liquid crystal layer is greater than a number of the elastomers in a unit volume of an annular sealing area away from the liquid crystal layer, so that the formed sealing layer 300 is capable of improving the puncture resistance and attains a better sealing effect.

Figure 2:
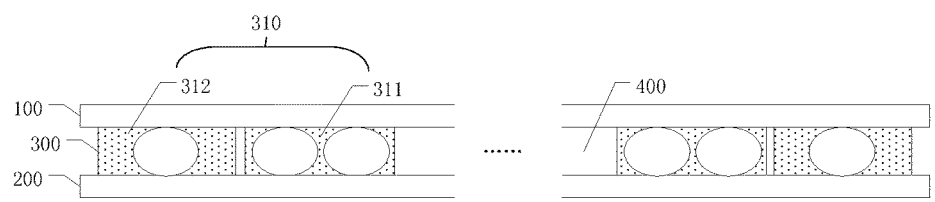
FIG. 2 shows a schematic view of another display panel provided by an embodiment of the present disclosure.
Figure 3:
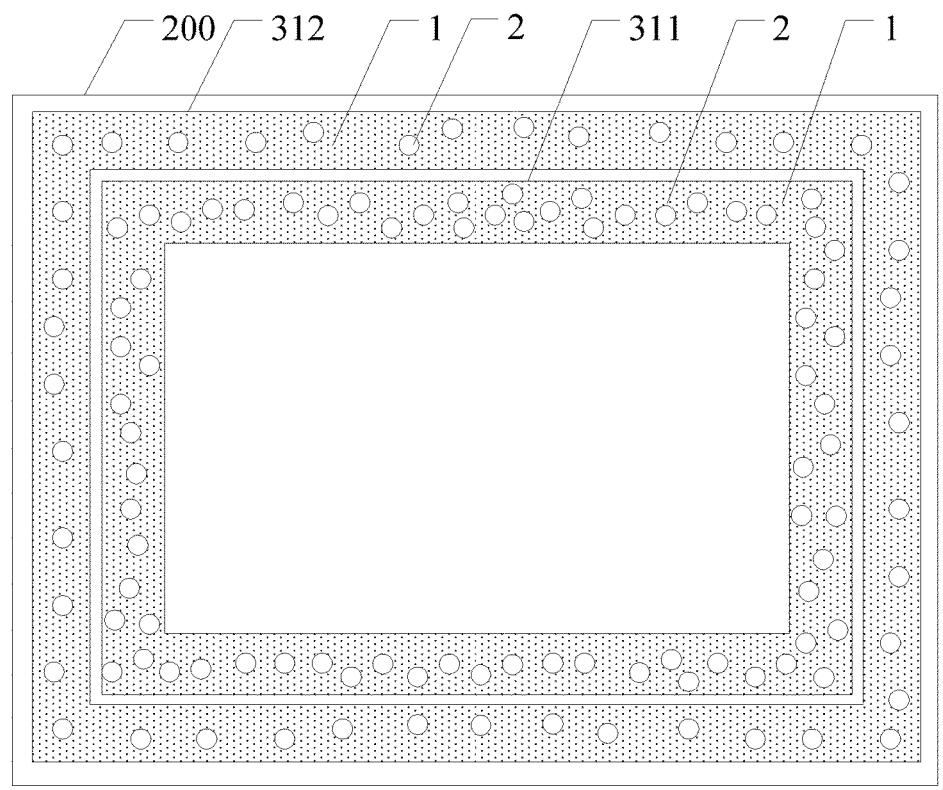
FIG. 3 shows a top view of the display panel shown in FIG. 2.

Referring to FIG. 2, FIG. 2 shows a schematic view of another display panel provided by an embodiment of the present disclosure, and the display panel comprises a first substrate 100, a second substrate 200, a liquid crystal layer 400 and a sealing layer 300 for sealing the liquid crystal layer 400 between the first substrate 100 and the second substrate 200, the sealing layer 300 comprises the first sealing pattern 310, and the first sealing pattern 310 is formed by the frame sealant composition comprising the elastomer 2 and the frame sealant 1. As shown in FIG. 2 and FIG. 3, the first sealing pattern 310 includes two mutually nested annular sealing areas 311 and 312 surrounding the liquid crystal layer, wherein, the annular sealing area 311 is at a side of the annular sealing area 312 close to the liquid crystal layer 400, and the number of the elastomers in a unit volume of the annular sealing area 311 is larger than the number of the elastomers in a unit volume of the annular sealing area 312.

For example, in the present embodiments, the frame sealant compositions with different number of elastomers in a unit volume can be used in annular sealing areas 311 and 312 respectively, and the frame sealant compositions are coated on the first substrate and the second substrate using a double tube-double nozzle coating method to form the first sealing pattern.

For example, in order to further improve the sealing performance of the sealing layer, the sealing layer further comprises a second sealing pattern formed by the frame sealant, and the second sealing pattern is disposed at a side of the first sealing pattern away from the liquid crystal layer.

Figure 4:
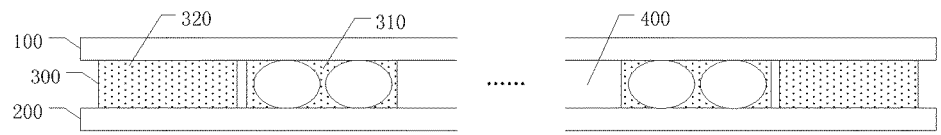
FIG. 4 shows a schematic view of another display panel provided by an embodiment of the present disclosure.

Referring to FIG. 4, FIG. 4 shows a schematic view of another display panel provided by an embodiment of the present disclosure, and the display panel includes a first substrate 100, a second substrate 200, a liquid crystal layer 400 and a sealing layer 300 for sealing the liquid crystal layer 400 between the first substrate 100 and the second substrate 200. The sealing layer 300 comprises the first sealing pattern 310, and the first sealing pattern 310 is formed by the frame sealant composition comprising the elastomer 2 and the frame sealant 1. Besides, a second sealing pattern 320 is further disposed at a side of the first sealing pattern 310 away from the liquid crystal layer 400, and the second sealing pattern 320 is formed by the frame sealant 1 having no elastomer, for example, the frame sealant may be obtained by blending acrylic resin and epoxy resin.

Figure 5:
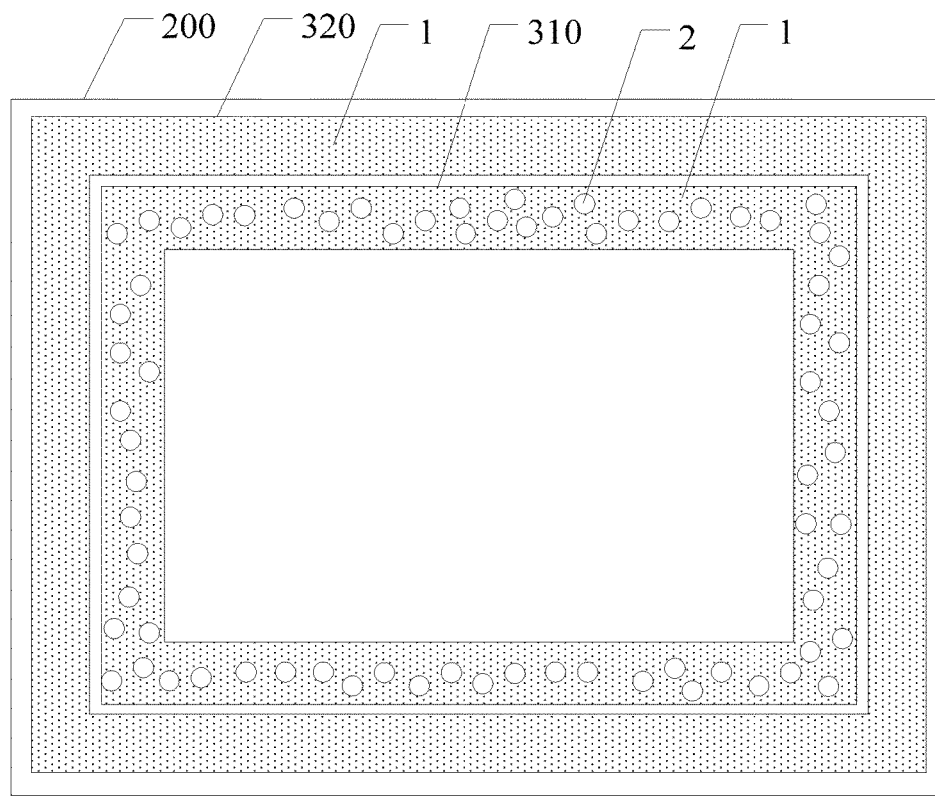
FIG. 5 shows a top view of the display panel shown in FIG. 4.

As shown in FIG. 5, the first sealing pattern 310 and the second sealing pattern 320 are two annular structures mutually nested to each other. And the second sealing pattern 320 is disposed at a side of the first sealing pattern 310 away from the liquid crystal layer 400, so that the formed sealing layer 300 not only improves the puncture resistance, but also has a better sealing performance.

Besides, an embodiment of the present disclosure further provides a display device, and the display device includes the display panel according to the above-mentioned embodiments of the present disclosure. Wherein, the display device provided by the embodiment of the present disclosure may be: a notebook computer display panel, a liquid crystal display, a liquid crystal television, a digital picture frame, a mobile phone, a tablet computer and any other products or components having a display function.

What are described above is related to the illustrative embodiments of the disclosure only and not limitative to the scope of the disclosure; the scopes of the disclosure are defined by the accompanying claims.

The present application claims the priority of the Chinese Patent Application No. 201510194928.2 filed on Apr. 22, 2015, which is incorporated herein by reference as part of the disclosure of the present application.

The invention claimed is:

1. A display panel, comprising:
a first substrate, a second substrate, a liquid crystal layer and a sealing layer for sealing the liquid crystal layer between the first substrate and the second substrate,
wherein the sealing layer comprises a first sealing pattern made of a frame sealant composition, the frame sealant composition comprises a frame sealant and elastomer, wherein the frame sealant composition is used for cell-assembling the first substrate and the second substrate, and each of the elastomers is pressed by the two substrates to form a barrier structure;
wherein each of the elastomers upon being not pressed is of a ball shape, and the diameter of the elastomer upon being not pressed is larger than a distance between the first substrate and the second substrate;
the first sealing pattern comprises a plurality of mutually nested annular sealing areas surrounding the liquid crystal layer;
wherein in any two adjacent annular sealing areas, a number of the elastomers in a unit volume of an annular sealing area closer to the liquid crystal layer is greater than a number of the elastomers in a unit volume of an annular sealing area further away from the liquid crystal layer.

2. The display panel according to claim 1, wherein the sealing layer further comprises a second sealing pattern comprising the frame sealant composition, and the second sealing pattern is disposed at a side of the first sealing pattern away from the liquid crystal layer.

3. A display device, comprising the display panel according to claim 1.

4. The display panel according to claim 1, wherein a material of the elastomers comprises at least one of olefin hydrocarbon and organic silicon.

5. The display panel according to claim 1, wherein a mass percentage of the elastomers in the frame sealant composition is from 0.01% to 80%.

6. The display panel according to claim 5, wherein a mass percentage of the elastomers in the frame sealant composition is from 10% to 70%.

7. The display panel according to claim 5, wherein a mass percentage of the elastomers in the frame sealant composition is from 30% to 50%.

8. The display panel according to claim 1, wherein the elastomers are evenly distributed in the frame sealant.

9. The display panel according to claim 1, wherein the elastomer upon being not pressed is of a ball shape, and a diameter of the elastomer upon being not pressed is from 3.6 µm to 11 µm.

* * * * *